United States Patent
Vashist et al.

(10) Patent No.: US 9,386,030 B2
(45) Date of Patent: Jul. 5, 2016

(54) SYSTEM AND METHOD FOR CORRELATING HISTORICAL ATTACKS WITH DIVERSE INDICATORS TO GENERATE INDICATOR PROFILES FOR DETECTING AND PREDICTING FUTURE NETWORK ATTACKS

(71) Applicants: TT GOVERNMENT SOLUTIONS, INC., Piscataway, NJ (US); KDDI CORPORATION, Shinuku, Tokyo (JP)

(72) Inventors: Akshay Vashist, Plainsboro, NJ (US); Ritu Chadha, Hillsborough, NJ (US); Abhrajit Ghosh, Edison, NJ (US); Alexander Poylisher, Brooklyn, NY (US); Yukiko Sawaya, Fujimino (JP); Akira Yamada, Fujimino (JP); Ayumu Kubota, Fujimino (JP)

(73) Assignee: VENCORE LABS, INC., Basking Ridge, NJ (US)

( * ) Notice: Subject to any disclaimer, the term of this patent is extended or adjusted under 35 U.S.C. 154(b) by 179 days.

(21) Appl. No.: 14/029,474

(22) Filed: Sep. 17, 2013

(65) Prior Publication Data
US 2014/0082730 A1    Mar. 20, 2014

Related U.S. Application Data

(60) Provisional application No. 61/702,453, filed on Sep. 18, 2012.

(51) Int. Cl.
*H04L 29/14* (2006.01)
*H04L 29/06* (2006.01)
*H04L 29/08* (2006.01)

(52) U.S. Cl.
CPC ........ *H04L 63/1416* (2013.01); *H04L 63/1425* (2013.01); *H04L 67/22* (2013.01)

(58) Field of Classification Search
None
See application file for complete search history.

(56) References Cited

U.S. PATENT DOCUMENTS 7,584,507 B1 * 9/2009 Nucci ................ H04L 63/1416
726/22

OTHER PUBLICATIONS

Lu et al., Robust and efficient detection of DDoS attacks for large-scale internet, Elsevier, 2007.*
Mukkamala et al., Detecting Denial of Service Attacks Using Support Vector Machines, IEEE, 2003.*
(Continued)

*Primary Examiner* — Minh Dinh
(74) *Attorney, Agent, or Firm* — Matthew M. Hulihan, Esq.; Heslin Rothenberg Farley & Mesiti P.C.

(57) ABSTRACT

An apparatus and method predict and detect network attacks by using a diverse set of indicators to measure aspects of the traffic and by encoding traffic characteristics using these indicators of potential attacks or anomalous behavior. The set of indicators is analyzed by supervised learning to automatically learn a decision rule which examines the temporal patterns in the coded values of the set of indicators to accurately detect and predict network attacks. The rules automatically evolve in response to new attacks as the system updates its rules periodically by analyzing new data and feedback signals about attacks associated with that data. To assist human operators, the system also provides human interpretable explanations of detection and prediction rules by pointing to indicators whose values contribute to a decision that there is an existing network attack or an imminent network attack. When such indictors are detected, an operator can take remediation actions.

18 Claims, 4 Drawing Sheets

(56) References Cited

OTHER PUBLICATIONS

Tang et al., Sketch-Based SIP Flooding Detection Using Hellinger Distance, IEEE, 2009.*

Liu, et al.; "Real-Time Detection of Stealthy DDoS Attacks Using Time-Series Decomposition"; Proceedings of IEEE International Conference on Communications, 2010; pp. 1-6.

* cited by examiner

SYSTEM AND METHOD FOR CORRELATING HISTORICAL ATTACKS WITH DIVERSE INDICATORS TO GENERATE INDICATOR PROFILES FOR DETECTING AND PREDICTING FUTURE NETWORK ATTACKS

This application claims priority from and the benefit of provisional patent application Ser. No. 61/702,453, filed on Sep. 18, 2012, which is incorporated herein by reference, in its entirety, for all purposes.

BACKGROUND OF THE DISCLOSURE

1. Field of the Disclosure

The present disclosure generally relates to a system and method for detecting and predicting network attacks. More specifically, it relates to correlating historical attacks with diverse indicators to generate indicator profiles and decision rules for detecting and predicting future network attacks.

2. Description of the Related Art

Accurate detection and prediction of network attacks is a difficult problem due to a large variation in the manifestation of attacks and their evolution over time. The variations and evolution make it difficult to create signatures that capture characteristics of attacks in the observed data. It would be desirable to construct a system that can recognize any ongoing attacks and provide warnings of any imminent attacks.

While DDoS detection is a well studied problem, most solutions produce an excessive number of false alarms of attacks and cannot detect variants of existing attacks.

The most widely studied approach for DDoS attack detection is the anomaly detection based approach. This approach is usually based on an unsupervised learning approach and does not use the knowledge of attacks at the time of constructing rules or models to detect or predict attacks. Anomaly based approaches use information about known attacks to evaluate the performance of an existing approach and not to improve the approach itself.

Recently there has been some work in time-series analysis for detecting DDoS attacks, but this work focuses on analyzing the time-series alone without considering which parts correspond to attacks. Although it captures some temporal component, the main drawback is high rates of false positives and false negatives or missed detections.

SUMMARY OF THE DISCLOSURE

In accordance with the disclosed embodiment, a supervised learning approach is used. This approach uses non-linear time-series analysis and the knowledge of known attacks to construct complex but sensitive rules that reduce the number of false positives, false negatives, reduce the detection latency, and allow imminent attacks, even when attack signals are relatively weak, to be predicted.

The present approach leverages a diverse set of indicators to measure various aspects of the traffic by devising novel mechanisms to encode traffic characteristics using indicators of potential attacks or anomalous behavior. The set of indicators is then analyzed by a supervised learning based method and a system to automatically learn a decision rule which looks at the temporal patterns in the coded values of the set of indicators to accurately detect and predict imminent network attacks. The rules automatically evolve in response to new attacks as the system updates its rules periodically by analyzing new data and the feedback signal about attacks in that data. To assist human operators, the system also provides succinct human interpretable explanations of its detection and prediction rules. The solution is very efficient and can be applied to a large Tier 1 network.

The disclosure herein can be the can be used to manufacture the following type of devices: network monitoring devices, network attack detection and prediction devices, filtering devices deployable at gateways, routers, home computers, etc., devices for providing warning of attacks and for suggesting counter-measures to eliminate or reduce the impact of attacks. Embodiments can be included in existing network monitoring devices for attack detection prediction or traffic filtering at gateways, routers or home computers. To do so, the traffic flowing through a network device is used to compute the values of indicators. The indicator values are used to learn to detect or predict attacks as described herein. Counter-measures to eliminate or reduce the impact of attacks are based on the indicator that the algorithms show to be responsible for making its decision on attack. Once specific indicators show that a network is under attack or an attack is imminent, appropriate remediation actions can be taken to bring the values of indicator to acceptable levels.

In general, the system and methods disclosed herein are of interest to Internet service providers (ISPs), network device manufacturers, governments and large organizations.

An embodiment disclosed herein is directed to a method for detecting and predicting network attacks comprising acquiring attack alerts and indicator values representative of network traffic; converting the alerts and indicator values into vectors; using the vectors to generate training data representative of the alerts and the indicator values; and implementing a learning algorithm to process the training data to generate decision rules used to detect or predict network attacks.

The method can further comprise processing network traffic to generate indicator values; converting the indicator values to vectors; and using the decision rules to process the vectors to determine whether a network attach is occurring. The indicator values have time stamps representative of their time of occurrence. A sliding window is used to collect indicators for processing during the window to determine if an alert should be issued.

The indicator values can be representative of indicators that include at least one selected from the group consisting of volume of traffic, rate of spoofing, rate of occurrence of unique source addresses, rate of occurrence of unique geographical locations of the source of traffic, ratio of SYN to non-SYN traffic and rate of occurrence of malicious source addresses.

A flow agent can be used to acquire network data, which can then be stored by, for example, a portion of a memory or a data collector. Generally there is one collector for each type of indicator values.

Stored network data can be routed to a real time flow filter for further processing of the network data to produce the indicator values.

Another embodiment disclosed herein is directed to a system for detecting and predicting network attacks comprising a data processor; and a memory accessible by the processor, the memory containing instructions readable by the processor to perform the steps of acquiring attack alerts and indicator values representative of network traffic; converting the alerts and indicator values into vectors; using the vectors to generate training data representative of the alerts and the indicator values; and implementing a learning algorithm to process the training data to generate decision rules used to detect or predict network attacks.

The system can further comprising instructions in the memory for processing network traffic to generate indicator values; converting the indicator values to vectors; and using the decision rules to process the vectors to determine whether a network attach is occurring.

The indicator values have time stamps representative of their time of occurrence, and there are further instructions in the memory for generating and using a sliding window to collect indicators for processing during the window to determine if an alert should be issued.

In the system, the indicator values are representative of indicators that include at least one selected from the group consisting of volume of traffic, rate of spoofing, rate of occurrence of unique source addresses, rate of occurrence of unique geographical locations of the source of traffic, ratio of SYN to non-SYN traffic and rate of occurrence of malicious source addresses.

In the system a flow agent acquires network data. A memory portion can be used for storing the network data acquired by the flow agent. A collector can store the network data for further processing. Each collector can store data representative of one indicator.

A real time flow filter can process the network data to produce the indicator values.

The system for detecting and predicting network attacks can also comprise first apparatus for acquiring attack alerts and indicator values representative of network traffic; second apparatus for converting the alerts and indicator values into vectors; third apparatus for using the vectors to generate training data representative of the alerts and the indicator values; and fourth apparatus for implementing a learning algorithm to process the training data to generate decision rules used to detect or predict network attacks.

Yet another embodiment disclosed herein is directed to a computer readable non-transitory storage medium storing instructions of a computer program which when executed by a computer system results in performance of steps of a method for detecting and predicting network attacks, comprising acquiring attack alerts and indicator values representative of network traffic; converting the alerts and indicator values into vectors; using the vectors to generate training data representative of the alerts and the indicator values; and implementing a learning algorithm to process the training data to generate decision rules used to detect or predict network attacks.

BRIEF DESCRIPTION OF THE DRAWINGS

A component or a feature that is common to more than one drawing is indicated with the same reference number in each of the drawings.

DESCRIPTION OF THE EMBODIMENTS

Figure 1:
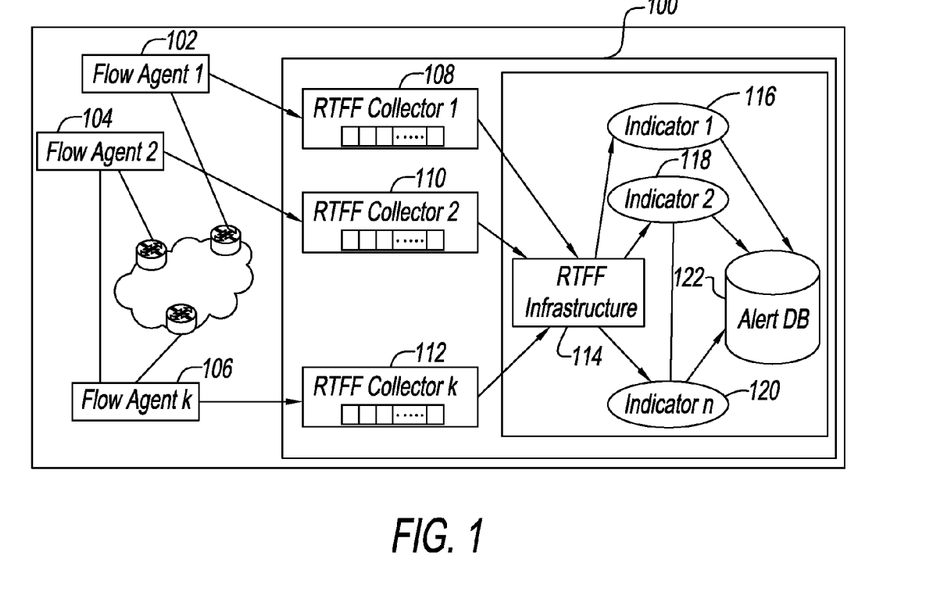
FIG. 1 is a high level block diagram of a real time flow filter (RTFF) used with the present disclosure.

FIG. 1 is a block diagram of a RTFF 100 that receives data from flow agents 102, 104 and 106, where 106 represents the $k^{th}$ flow agent. Each flow agent 102, 104, 106 is connected, respectively, to a RTFF collector 108, 110, 112, where 112 represents the $k^{th}$ collector. The output of collector 108, 110, 112 is provided to a RTFF infrastructure 114 which provides as outputs indicators 116, 118 and 120, where 120 represents an $n^{th}$ indicator. The operation of RTFF infrastructure 114 is based on a combination of hardware and software as described below. The indicators 116, 118, 120 and others are stored in an alert database 122. One example of the implementation of an RTFF can be found in co-pending U.S. patent application Ser. No. 13/916,693 filed on Jun. 13, 2013 and assigned to the assignee of the present application.

Figure 2:
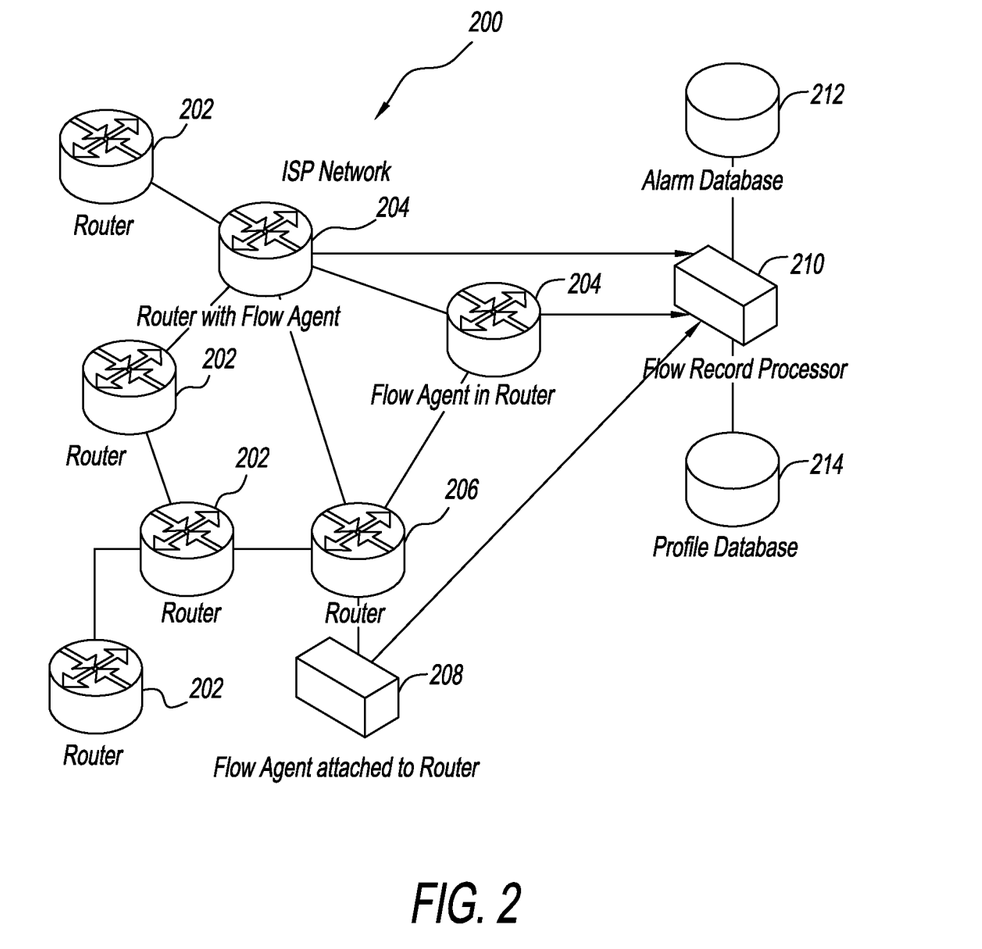
FIG. 2 is a block diagram of a network including flow agents for use with the real time flow filter of FIG. 1.

FIG. 2 illustrates a network including flow agents. An Internet Service Provider (ISP) network, shown generally at 200, contains routers 202 that forward traffic through the network to the hosts at the network edge. Some of these routers 204 may have internal flow agents. Other routers 206 are implemented in conjunction with these flow agents 208. Flow agents 208 monitor the network, collect data (such as IP addresses, port numbers, and amount of traffic), and send this data to a flow record processor 210. An alarm database 212 and a profile database 214 are associated with flow record processor 210.

Figure 3:
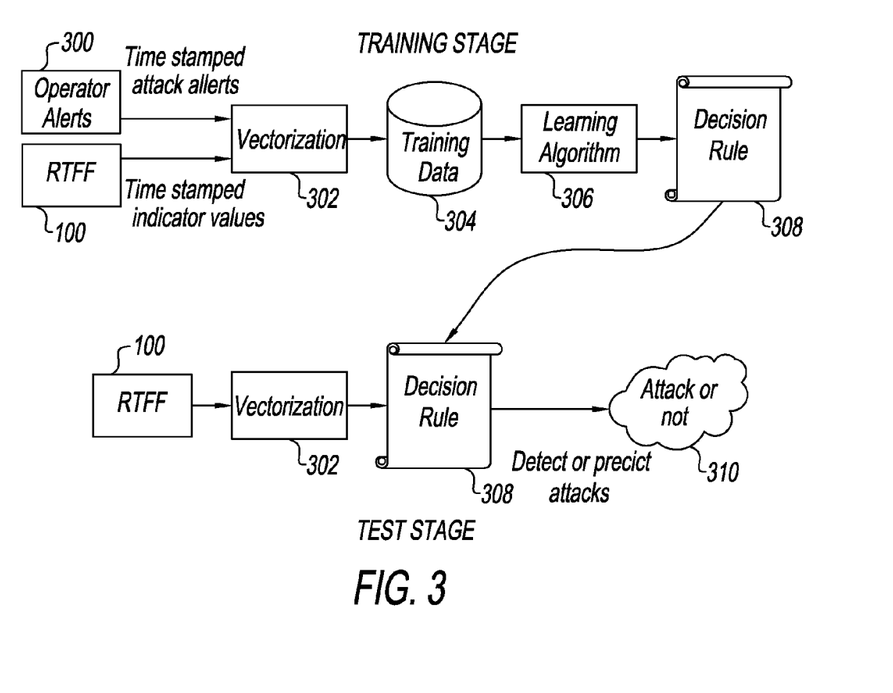
FIG. 3 illustrates the training and testing stages of the embodiments disclosed herein.

Referring to FIG. 3, the general training and testing stages of the system and method disclosed herein are illustrated. During training, operator alerts 300 in the form of time stamped attack alerts and time stamped indicator values from RTFF 100 undergo vectorization at 302. The vectors are converted to training data at 304. The training data from 304 is converted to a learning algorithm at 306. The learning algorithm or algorithms are used to produce a decision rule at 308.

Continuing in FIG. 3, during test or actual use, time stamped indicator values from RTFF 100 are processed by vectorization at 302. The resulting vectors are subjected to decision rules 308. A determination is then made at 310 as to whether an attach has occurred or an attack is predicted.

The attack detection and prediction system of the present disclosure has four principal components:
1. Indicator Computation: Monitor the sampled network traffic destined to a node or a set of nodes and analyze it to compute the values of indicators.
2. Vector Generation: Transform the instantaneous values of indicators to vectors describing the time-series of indicators.
3. Training: Use historical time-series data and information about known attacks in the given historical data to computationally learn rules for detecting and predicting attacks.
4. Testing: Detect or predict attacks based on current state of the time-series of the indicators.

The goal is to detect attacks at a set of given destinations or nodes in a network. To do this, different characteristics of network traffic to destinations of interest using six different indicators are monitored. Each indicator determines whether a specific characteristic is observed in the traffic or not, so it can take one of the two binary values, 0 for OFF and 1 for ON or fired. The indicators are calculated by analyzing the attributes of traffic destined to each of those nodes. To detect nodes under attack, the focus is on analyzing traffic destined to a node. The following set of indicators is used:
   a. Volume based: volume of traffic measured in bytes, packets, and flows to a target node
   b. Spoofing based: rate at which spoofed source addresses are observed
   c. Source IP diversity based: rate of unique source addresses observed d. IP geo-location based: rate of unique geographical sources observed
e. SYN ratio analysis: rate of SYN to non-SYN TCP packets
f. Malicious source IP: rate of observation of blacklisted IP addresses as sources.

A communication network is a dynamic and evolving system where traffic characteristics can fluctuate temporally and change over time. This is because new applications are created and some of these applications may have different traffic characteristic than that of the existing ones. In addition, typical user behavior also evolves over time and can lead to change in the distribution of traffic. Distinguishing between legitimate changes due to the advent of new applications, or changes in user behavior, and the illegitimate traffic indicative of attacks is a difficult problem. This results in high rates of false positives for attacks, in detecting attacks using automated methods. One way to avoid the false positives or erroneously triggering of indicators is to avoid firing (setting the state to ON) of indicators based on static threshold. In the approach herein, a dynamic threshold for every indicator is used. The dynamic threshold is updated frequently and it is computed as an affine weighted combination of historical threshold and the current value of the traffic. The weight for the historical threshold is usually larger than for the current value to emphasize that the dynamic threshold does not change drastically; a large weight for the historical threshold is also justified by the fact that long term traffic behavior due to introduction of new applications changes slowly. Using a dynamic threshold to decide whether indicators fire or not, allows the system to suppress the false positives in many ways. A dynamic threshold can absorb any gradual changes in the traffic characteristics, for example, when new applications are introduced or user behavior evolves. The changes are usually slow and thus can be easily absorbed in the dynamic threshold because of the affine combination. Furthermore, the dynamic threshold is also a function of time, so it is sensitive to temporal and periodic changes in traffic characteristics.

The indicator computation system called the Real Time Flow Filter (RTFF) computes a set of indicators from the flow data. The indicators attempt to measure limited individualized characteristics of destinations which might be under attack. The RTFF is a self-adjusting, real-time filtering anomaly detection system. The system described in the current document analyzes the outputs of RTFF. The indicators described above are constituent elements provided by the RTFF and each indicator generates alerts based on analysis and trending of traffic to one or more destinations. The analysis and trending performed by an indicator considers several traffic characteristics.

For detecting and predicting attacks, it is assumed that for historical data, information about destinations that had been under attack is available. Such information can be derived from many sources, including actual network traffic.

One of the unique aspects of the present disclosure is to detect attacks by combining different characteristics of traffic. Furthermore, the approach herein uses a dynamic threshold for indicators, which provides several benefits, as described above.

A simultaneous analysis of multiple indicators not only makes attack detection more accurate, it also enables prediction of attacks. For instance, there are cases of DDoS attack where prior to increase in volume, source IP diversity or diversity of IP geolocation from which traffic is received, increases. Since indicators to give insights into various aspects to traffic which can be precursors of different types of attacks are exploited, the information used is much richer and stratified. The rich information coupled with the use of strong learning methods capable of picking up non-linear relationships between indicators and attacks, allows the system described herein to predict attacks.

Vector Generation

Figure 4:
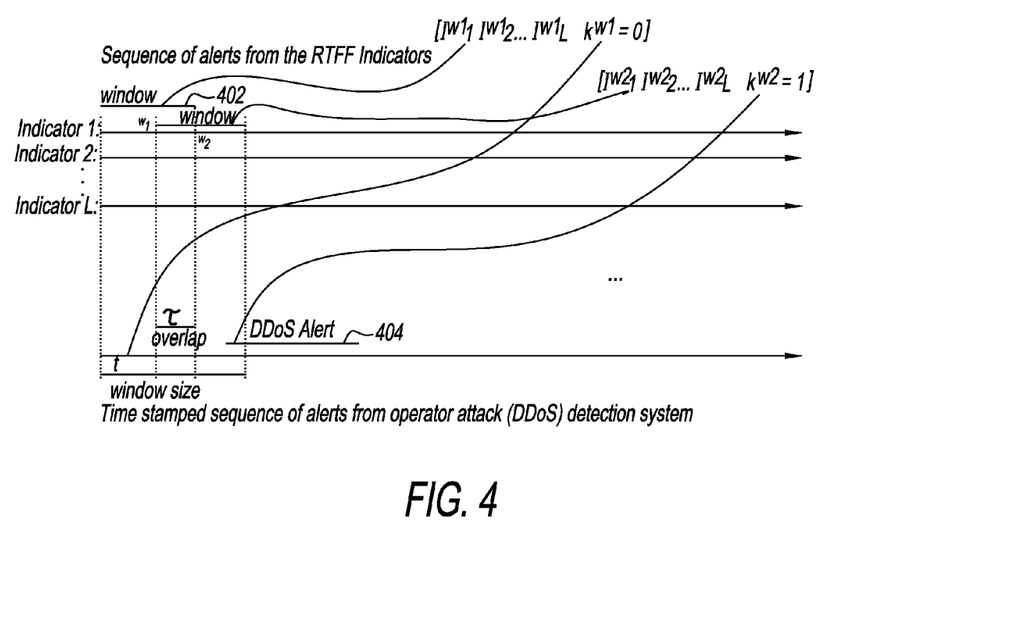
FIG. 4 is a chart depicting a logical view of data collection at a destination in a network in accordance with a sliding window based time-series of indicator values and a corresponding attack or non-attack result.

It is assumed that L (L=6 in the example herein) different indicators are available for analyzing, detection, and predicting attacks. The figure below describes the data collection process for detecting and prediction attacks.

FIG. 4 is a chart depicting a logical view of data collection at each destination in a network. This process generates a sliding window 402 based time-series of indicator values, for each indicator from a database of the RTFF 100. A corresponding output, indicative of a non-attack or of an attack, is provided for each window. Only a particular case where the system detects and predicts DDoS attacks 404 is shown. The window size t and overlap interval $\tau$ for sliding the time window are the free parameters having default values that can be changed in the system.

The steps in the data collection are as follows
1. Fix a time window of size t, and an overlap interval $\tau$, for sliding the time window.
2. A time window is specified by a beginning time $t_{beg}$ and an end time $t_{end}$.
3. For each time window:
   a. From the RTFF (real time flow filter) alert database, for each destination (may be anonymized) and for each indicator, extract the number of times it has fired between $t_{beg}$ and $t_{end}$. The indicator alert database records only the events related to setting/firing and clearing the indicators; during any window when the indicator is not specified in the database, the current state is the most recent state (fired/cleared). This is done to reduce the size of the database table. Due to this, whenever the value of an indicator is not explicitly recorded in the database, the most recent recorded value as the current value is considered.
   b. Also record the threshold for each of the indicators in that time window.
   c. From the operator alert database, extract, if there was an DDoS alert for any of destinations in the given time window.
   d. While the approach described herein can be applied to a multi-level granularly of collection of destination, individual destinations, subnets, networks, etc., in a current realization, focus is on detecting and predicting attacks at individual destinations. Accordingly, for each destination, a fixed sized and time-stamped vector containing number of times each indicator fired, their threshold and a Boolean field indicating alerts from the operator's DDoS system, is constructed.
4. Slide the time window to the next, i.e. the window in the interval $[t_{end}-\tau, t_{end}-\tau+t)$;
5. Collect such vectors for all destinations of interest and over the sequence of time windows in the duration, for analysis
6. Vectors of data gathered from multiple destinations in the duration of analysis [0,T] are collected at a central place for correlation analysis, generating patterns and rules for detecting and predicting attacks.

Figure 5:
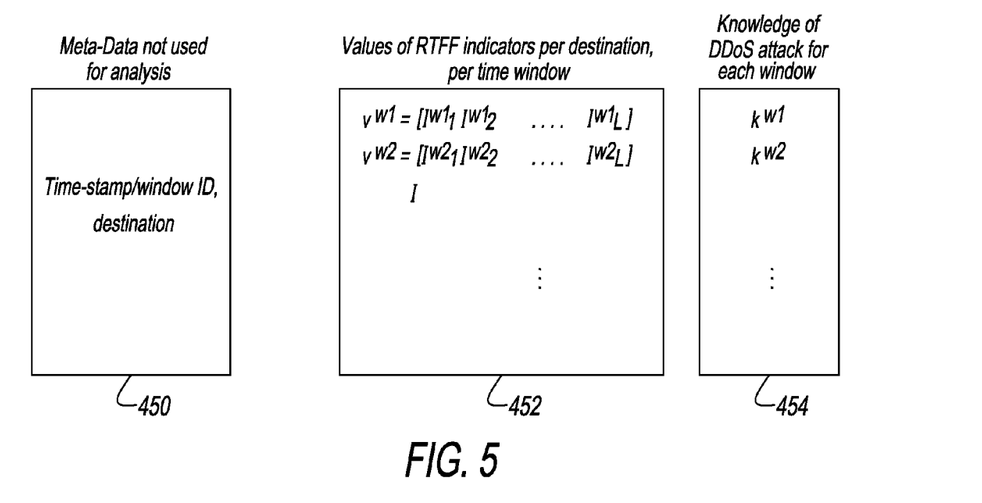
FIG. 5 is a chart depicting a notional view of data for correlation analysis.

FIG. 5 is a notational view of data. Meta-data not used for analysis is represented at 450. Values of the indicators represented by the vectors per destination, per time window are represented at 452. The result of the analysis herein, to indicate whether an attack has occurred, for each window, is represented at 454.

Supervised Learning for Detecting Attacks.
 a. The knowledge of destinations under DDoS attacks (including the duration of attack for each destination) is used during data analysis and for constructing models for detection and prediction
 b. Feedback during learning is used to enable supervised learning to create more relevant and accurate models.
 c. The detection problem is formulated.
  1. The size of history of windows (h) to be considered is empirically decided.
  2. New vectors V' incorporating historical information about the firing of RTFF alerts in the window $w_i$, i.e., $V^{wi}=[v^{wi-h}, v^{wi-h+1}, \ldots, v^{wi}]$ are constructed.
  3. The following pairs for training a detection function $f_{detect}$ are constructed:
   Training Data: $\{(V^{w1}, k^{w1}), (V^{w2}, k^{w2}), \ldots, (V^{wn}, k^{wn})\}$, assuming there were a total of n windows in the data, where $V^{wi}$ is the vector constructed in step b above, and $k^{wi}$ indicates whether a DDoS attack was observed at the destination, at the end of the time window $w_i$.
  4. A supervised learning approach (such as SVM) is used to learn the detection function. SVMs can uncover highly complex decision rules, and have good theoretical properties and excellent performance in practice that makes them state-of-the-art learning algorithms. The details of supervised learning using SVM and the training data mentioned in step 3. above are described below.

Supervised Learning for Predicting Attacks
In principle, the prediction problem is very similar to the detection problem:
 a. The difference is in formulation of the training data.
 b. In detection, the goal is to output the warning that matches DDoS warning in the current window.
 c. In prediction, the goal is to output the warning that matches the DDoS warning in a future window (such information is available in the collected data).
 d. The difference is in the formulation of the training data.

Formulation of Training Data for Attack Prediction:
 a. The number of steps, s, into the future that are to be predicted is decided.
 b. The size of history of windows (h) to consider is decided empirically.
 c. New vectors $V^{wi}$ incorporating historical information about the firing of RTFF alerts in the window $w_i$, i.e., $V^{wi}=[v^{wi-h}, v^{wi-h+1}, \ldots, v^{wi}]$ are constructed.
 d. The following pairs for training a detection function $f_{pred}$ are constructed:
  Training Data: $\{(V^{w1}, k^{w1+s}), (V^{w2}, k^{w2+s}), \ldots, (V^{wn}, k^{wn+s})\}$, assuming there were a total of n+s windows in the data. Here V' is the vector constructed in step c above, and $k^{wi+s}$ indicates whether a DDoS attack was observed at the destination s steps after the end of the time window $w_i$, i.e. at the end of the window $w_{i+s}$.
 e. The same supervised learning approach (say, SVM) to learn $f_{pred}$ is used.
 f. For improved accuracy, SVM with RBF kernels are used; however, the detection and prediction rules generated by SVM are not readily human interpretable. Thus, a decision tree approach to learn rules which can be interpreted by human experts/network operators is also used.

In the vector generation method described above, there are two free parameters, the window size and the history of windows (embedding dimension of the time-series) to consider for detecting and predicting attacks. The system determines them empirically using the cross-validation approach where different values of these parameters are explored and the ones that yield the best performance are selected and used.

The RTFF 100 analyzes the traffic at nodes of interest and outputs the set of indicators for those nodes. Consider the output of RTFF 100 and operator alerts over time at a host H, which might appear as follows:

| Indicator | $t_1$ | $t_2$ | $t_3$ | $t_4$ | $t_5$ | $t_6$ | ... | $t_i$ | $t_{i+1}$ | ... | $t_T$ |
|---|---|---|---|---|---|---|---|---|---|---|---|
| $I_1$ | 0 | 0 | 0 | 0 | 0 | 0 | ... | 0 | 1 | ... | 0 |
| $I_2$ | 0 | 1 | 0 | 0 | 1 | 0 | ... | 0 | 0 | ... | 0 |
| $I_3$ | 0 | 0 | 1 | 1 | 0 | 1 | ... | 1 | 0 | ... | 1 |
| $I_4$ | 0 | 0 | 1 | 1 | 0 | 0 | ... | 0 | 0 | ... | 0 |
| $I_5$ | 0 | 0 | 0 | 0 | 0 | 0 | ... | 0 | 0 | ... | 0 |
| $I_6$ | 0 | 0 | 0 | 1 | 0 | 1 | ... | 1 | 1 | ... | 1 |
| OA | 0 | 0 | 1 | 1 | 0 | 1 | ... | 1 | 0 | ... | 1 |

This data indicates that at time $t_i$ none of the indicators fired and there was no attack, at time $t_2$ indicator $I_2$ fired and there was no attack, at time $t_3$ indicators $I_3$, $I_4$ fired and there was an attack, etc.

If the history size is 3 and window overlap size is 2, then the vectors for training will be:

| | | | |
|---|---|---|---|
| 0 0 0 0 0 0 | 0 1 0 0 0 0 | 0 0 1 1 0 0 | 1 < - first vector |
| 0 1 0 0 0 0 | 0 0 1 1 0 0 | 0 0 1 1 0 1 | 1 < - second vector |
| 0 0 1 1 0 0 | 0 0 1 1 0 1 | 0 1 0 0 0 0 | 0 < - third vector |

Where the initial six entries in the first vector indicate the values of six indicators at time $t_1$, the next six entries indicate the indicator values at time $t_2$ and the final six entries indicate indicator values at the time $t_3$. The last value indicates that there was an attack observed at time $t_3$. Similarly the second vector contains indicator values at $t_2$, $t_3$, and $t_4$ and the last value indicates that there was an attack at time $t_4$. The other vectors are constructed similarly.

Supervised Learning Using SVM.
As indicated above, the same method is used to detect and predict attacks. The difference between the detection problem and prediction problem is in the formulation of the training data. For the detection problem, the target label is the state of the network at the end of latest window in the vector. On the other hand, for the prediction problem, the target label is the state of the destination (under-attack or not-under-attack) at a fixed number of intervals in the future. The supervised learning approach to learn the detection function $f_{detect}$ and the prediction function $f_{pred}$ is now described.

To learn the decision rules, the SVM (or Support Vector Machines) algorithm is used. Briefly, SVM uses the training data $\{(x_i, y_i)\}_{i=1}^{l}$ to learn a decision rule $y=f(x)$ that takes an unlabeled test data point as input and produces its label. The decision rules has the form:

$$f(x) = \sum_{i=1}^{\ell} \alpha_i K(x, x_i) + b$$

where b is a constant, $K(x, x_i)$ is the kernel similarity between the test data point and the training data point $x_i$. The coefficients $\alpha_i$'s are determined by solving the following quadratic optimization:

$$\min_{\vec{\alpha},b} \sum_{i=1}^{\ell} \alpha_i - \frac{1}{2} \sum_{i,j=1}^{\ell} \alpha_i \alpha_j y_i y_j K(x_i, x_j)$$

$$\text{subject to} \begin{cases} \sum_{i=1}^{\ell} \alpha_i y_i = 0; \\ 0 \le \alpha_i \le C, \quad i = \{1, \ldots, \ell\}. \end{cases}$$

C is a user specified parameter in the above optimization problem. There are efficient procedures to solve the above quadratic optimization problem.

As an example, the training vectors along with their labels (attack or not-an-attack) are input to the SVM algorithm to learn a detection or prediction function. In a simple case, suppose one inputs the above training data (shown in response 5) to the SVM algorithm, the SVM algorithm solves the optimization problem described herein and will arrive at a decision rule. If that rule was a linear decision rule, the rule learns weights for each of the indicators and has the form: $f_{detect} = w_1 I_1^{t0} + w_2 I_2^{t0} + w_3 I_3^{t0} + w_4 I_4^{t0} + w_5 I_5^{t0} + w_6 I_6^{t0} + w_7 I_1^{t1} + w_8 I_2^{t1} + w_9 I_3^{t1} + w_{10} I_4^{t1} + w_{11} I_5^{t1} + w_{12} I_6^{t1} + w_{13} I_1^{t2} + w_{14} I_2^{t3} + w_{15} I_3^{t3} + w_{16} I_4^{t3} + w_{17} I_5^{t3} + w_{18} I_6^{t3}$, where the $w_i$ are the weights and the $I_i^{tj}$ is the value of indicator i at time $t_j$.

An off-the-shelf implementation of the decision tree algorithm, such as, for example, C4.5 can be used. The decision tree approach is used to generate profiles of attacks. For example, based on the above training data, the algorithm could generate the following profile: if indictors 3 and at least one of the indicators 4 or 5 fire (are set to 1), then there is deemed to be an attack.

In supervised learning (SVM, as described above), there are two distinct stages: the training stage and the test stage.

The Training Stage.

At the training stage, the given labeled data is used to determine the values of the coefficients $\alpha_i$'s and the threshold b by solving the quadratic program above. This is a computationally intensive step but it can be solved offline and needs to be solved once or infrequently. The only difference in learning to detect and predict is in the formulation of the training data. The system can learn the prediction function $f_{pred}$ (or the detection function $f_{detect}$) using aggregated training data collected from multiple destinations or from data collected from individual destinations.

The Test Stage

The test stage uses the results of learning (the coefficients $\alpha_i$'s and the threshold b determined at the training stage) to evaluate the function (1) for a new observation x. The function evaluation is computationally inexpensive and it can be done in real time. The evaluation of function (1) produces a label for detecting or predicting an attack; when the label is produced by evaluating the function $f_{pred}$ the system predicts the attacks, and when the label is produced by evaluating the function $f_{detect}$ the system detects the attacks.

From the above, it clearly follows that for detecting any other attack (other than DDoS), anybody skilled in the art will just have to replace the labels in the training data and perhaps formulate the training vectors differently. Once the training data is appropriately formulated and used to solve the optimization problem above, the system will produce a function to detect a new type of attack. In one embodiment of the system, only the DDoS attack is considered, however, the disclosure is general and can be used to detect and predict other attacks as long as their historical information is available.

The system and method described herein can learn from historical training data collected from an individual destination, or from data collected from a set of destinations. The advantage of learning from data collected from a single destination is that detection and prediction of attacks will be derived from observations unique to that destination and so the resulting detection and prediction function will be very specific to this destination. The disadvantage is that the system will have to learn individual functions for each node, so this will be more computationally expensive. However, training data from a single destination can be limited in size and in variability (manifestations of attacks observed, or if no attacks have been observed at the given destination), so the resulting detection and prediction functions may not be able to detect attacks that have been observed in the network, but not at that destination.

The advantage of learning from training data aggregated across a set of nodes is that the resulting detection and prediction functions can detect any attacks that have been observed in the past, at any of the nodes. This provides for better generalization. On the other hand, due to a large amount of training data, the training stage can be computationally expensive, and also requires the system to collect the data from multiple destinations at a central node where learning will take place.

There can also be a hybrid of the two approaches where the system can use two detecting and predicting functions: one derived from the training data local to the node and the other derived from the training data aggregated across nodes.

The present disclosure has a unique perspective on the attack detection and prediction problem. Rather than identifying per packet-anomalies, instead, the present approach aggregates across multiple packets and multiple types of anomalies. Also, rather than focusing on detection, the approach disclosed herein performs prediction using these types of anomaly detectors.

In summary, the present system and method is based on an understanding that for detecting attacks in a large network, one needs to focus on large scale statistical techniques rather than per packet analysis. Based on this understanding, the system and method rely on a variety of indicators (source diversity, geographical location of the host, traffic volume, etc.) to measure large scale deviations in traffic patterns. Accurate operation can be verified by working in close collaboration with a tier 1 ISP, where the details of the network are known.

To construct rules to detect and/or predict attacks, the system and method disclosed herein requires input data that consists of pairs describing (i) the state of the network, and (ii) whether the network was under attack or not. The state of the network is represented by the set of indicators output by RTFF 100, and the information about the DDoS network attack is obtained from the operator alert database. The system can be adapted to detect or predict new kinds of attacks by changing the composition of the pairs in the input data. For example, to detect a malware attack, the set of indicators from RTFF 100 is paired with information about the presence or absence of the malware attack. The information about the malware attack can be obtained from the operator alert database, user reports etc. After the new input data is obtained, it is input to the learning algorithm (SVM) described herein, to learn decision rules for detecting and predicting the new type of attack.

Early Warning of Attack.

Designing predictive algorithms as part of machine learning research enables the analysis and formulation of the problem from a theoretical learning perspective. This allows successfully modeling the characteristics essential for predicting attacks when indicators are not strong and the attack signal is weak, thus allowing for the following advantages:

1. Ability to detect 0-day attacks that are variations of attacks observed in the past.
2. Detection of stealth attacks that involve gradual changes in traffic volume and other characteristics.
3. Use of diverse indicators makes the system more robust and sensitive to detect attacks. The indicators measure potential changes in volume, spoofed IPs, source IP diversity, IP geo-location, SYN ratio, and malicious source IPs.
4. Adaptation to quickly learn new attacks and their variants by (i) continuously and automatic adapting the thresholds for indicators based on recent trends in the observed traffic, and by (ii) incrementally learning to adapt the rules for detecting and predicting network attacks.
5. Ability to predict imminent attacks before they disrupt the network.
6. Ability to provide remediations (if remediations are provided as part of the training data).
7. Ability to discover/generate signature temporal patterns and rules to detect and predict attacks.
8. Ability to provide information about which indicators play a dominant and/or decisive role for given attacks.

Figure 6:
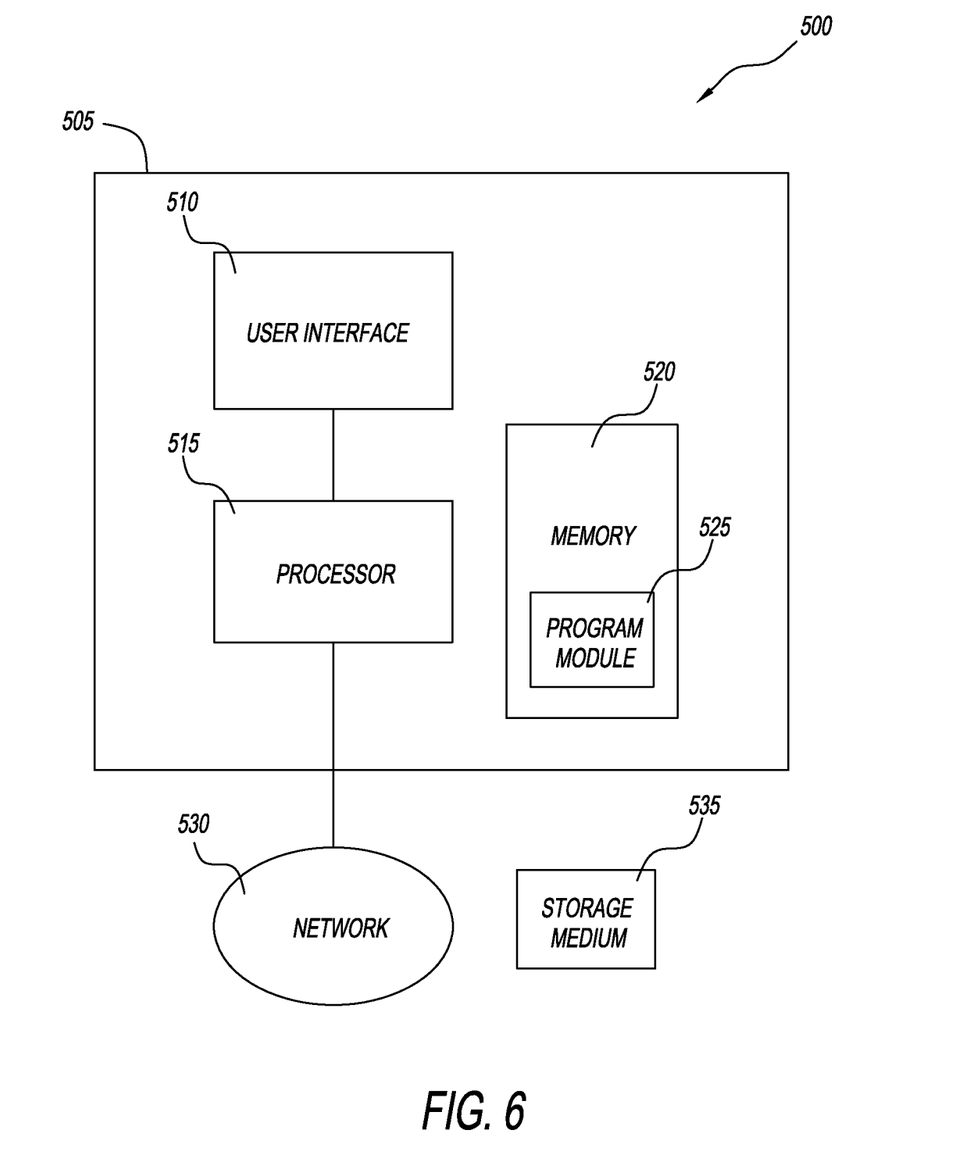
FIG. 6 is an illustration of a computer system used to implement the disclosed embodiments.

Referring to FIG. 6, computer system 500, on which the present method and system can be implemented, includes a computer 505 coupled to a network 520, e.g., the Internet. Computer 505 includes a user interface 510, a processor 515, and a memory 525. Computer 505 may be implemented on a general-purpose microcomputer. Although computer 505 is represented herein as a stand-alone device, it is not limited to such, but instead can be coupled to other device (not shown) via network 520.

Processor 515 is configured with logic circuitry that responds to and executes instructions. Memory 525 stores data and instructions for controlling the operation of processor 515. Memory 525 may be implemented in a random access memory (RAM), a read only memory (ROM), or a combination thereof. One component of memory 525 is a program module 530. Program module 530 contains instructions for controlling processor 515 to execute the methods described herein.

The term "module" is used herein to denote a functional operation that may be embodied either as a stand-alone component or as an integrated configuration of a plurality of sub-ordinate components. Thus, program module 530 may be implemented as a single module or as a plurality of modules that operate in cooperation with one another. Moreover, although program module 530 is described herein as being installed in memory 525, and therefore being implemented in software, it could be implemented in any of hardware (e.g., electronic circuitry), firmware, software, or a combination thereof.

User interface 510 includes an input device, such as a keyboard or speech recognition subsystem, for enabling a user to communicate information and command selections to processor 515. User interface 510 also includes an output device such as a display or a printer. A cursor control such as a mouse, track-ball, or joy stick, allows the user to manipulate a cursor on the display for communicating additional information and command selections to processor 515. Processor 515 outputs, to user interface 510, a result of an execution of the methods described herein. Alternatively, processor 515 could direct the output to a remote device (not shown) via network 520.

While program module 530 is indicated as already loaded in memory 525, it may be configured on a storage medium 535 for subsequent loading into memory 525. Storage medium 535 can be any conventional storage medium that stores program module 530 thereon in tangible form. Examples of storage medium 535 include a hard disk drive, a floppy disk, a compact disk, a magnetic tape, a read only memory, an optical storage media, universal serial bus (USB) flash drive, a digital versatile disc, or a zip drive. Alternatively, storage medium 535 can be a random access memory, or other type of electronic storage, located on a remote storage system and coupled to computer 505 via network 520.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. Further, while the embodiments described herein have been implemented by a digital processor running a series of computer instructions, other embodiments may be implemented using various hardware components and circuits. For example, circuits can be used to implement various counters, timers and comparators to implement the system and method described herein. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:
1. A method for detecting and predicting network attacks, the method comprising:
    acquiring attack alerts and indicator values representative of network traffic;
    converting the alerts and indicator values into vectors;
    using the vectors to generate training data representative of the alerts and the indicator values;
    implementing a learning algorithm to process the training data to generate decision rules; and
    performing network attack detection or prediction based on the generated decision rules, the performing network attack detection or prediction comprising:
        processing network traffic to generate indicator values, each indicator value indicative of whether a respective attack characteristic is observed in the network traffic, wherein the indicator values are representative of indicators that include volume of traffic, rate of spoofing, rate of occurrence of unique source addresses, rate of occurrence of unique geographical locations of the source of traffic, ratio of SYN to non-SYN traffic and rate of occurrence of malicious source addresses, wherein each indicator value has a respective dynamic threshold associated therewith based on which the indicator value is set to indicate whether the respective attack characteristic is observed, and wherein the dynamic threshold varies over time based at least in part on historical values for the dynamic threshold; and determining, based on the generated indicator values, whether a network attack is indicated by the network traffic.

2. The method of claim 1, wherein the performing network attack detection further comprises:

converting the generated indicator values to vectors,
wherein the determining whether the network attack is indicated comprises using the decision rules to process the vectors to determine whether a network attack is occurring.

3. The method of claim 2, wherein the indicator values have time stamps representative of their time of occurrence, and wherein the method further comprises using a sliding window to collect indicators for processing during the window to determine if an alert should be issued.

4. The method of claim 1, further comprising using a flow agent to acquire network data.

5. The method of claim 4, further comprising routing the data to a collector for storing the network data for further processing.

6. The method of claim 5, further comprising routing stored network data to a real time flow filter for further processing of the network data to produce the indicator values.

7. The method of claim 1, further comprising routing network data to a real time flow filter for processing of the network data to produce the indicator values.

8. The method of claim 1, further comprising updating a dynamic threshold associated with an indicator value, the updating comprising determining an updated dynamic threshold as a weighted combination of one or more historical values of the dynamic threshold and a current value of the network traffic.

9. A system for detecting and predicting network attacks, the system comprising:

a data processor; and
a memory in communication with the processor, the memory storing instructions readable by the data processor to perform a method comprising:
acquiring attack alerts and indicator values representative of network traffic;
converting the alerts and indicator values into vectors;
using the vectors to generate training data representative of the alerts and the indicator values;
implementing a learning algorithm to process the training data to generate decision rules; and
performing network attack detection or prediction based on the generated decision rules, the performing network attack detection or prediction comprising:
processing network traffic to generate indicator values, each indicator value indicative of whether a respective attack characteristic is observed in the network traffic, wherein the indicator values are representative of indicators that include volume of traffic, rate of spoofing, rate of occurrence of unique source addresses, rate of occurrence of unique geographical locations of the source of traffic, ratio of SYN to non-SYN traffic and rate of occurrence of malicious source addresses, wherein each indicator value has a respective dynamic threshold associated therewith based on which the indicator value is set to indicate whether the respective attack characteristic is observed, and wherein the dynamic threshold varies over time based at least in part on historical values for the dynamic threshold; and
determining, based on the generated indicator values, whether a network attack is indicated by the network traffic.

10. The system of claim 9, wherein the performing network attack detection further comprises:

converting the generated indicator values to vectors,
wherein the determining whether the network attack is indicated comprises using the decision rules to process the vectors to determine whether a network attack is occurring.

11. The system of claim 10, wherein the indicator values have time stamps representative of their time of occurrence, and wherein the method further comprises using a sliding window to collect indicators for processing during the window to determine if an alert should be issued.

12. The system of claim 9, further comprising a flow agent to acquire network data.

13. The system of claim 12, further comprising a collector for storing the network data for further processing.

14. The system of claim 13, further comprising a real time flow filter for further processing of the network data to produce the indicator values.

15. The system of claim 9, further comprising a real time flow filter for processing of the network data to produce the indicator values.

16. The system of claim 9, wherein the method further comprises updating a dynamic threshold associated with an indicator value, the updating comprising determining an updated dynamic threshold as a weighted combination of one or more historical values of the dynamic threshold and a current value of the network traffic.

17. A system for detecting a predicting network attacks, the system comprising:

first apparatus for acquiring attack alerts and indicator values representative of network traffic;
second apparatus for converting the alerts and indicator values into vectors;
third apparatus for using the vectors to generate training data representative of the alerts and the indicator values;
fourth apparatus for implementing a learning algorithm to process the training data to generate decision rules; and
fifth apparatus for performing network attack detection or prediction based on the generated decision rules, the performing network attack detection or prediction comprising:
processing network traffic to generate indicator values, each indicator value indicative of whether a respective attack characteristic is observed in the network traffic, wherein the indicator values are representative of indicators that include volume of traffic, rate of spoofing, rate of occurrence of unique source addresses, rate of occurrence of unique geographical locations of the source of traffic, ratio of SYN to non-SYN traffic and rate of occurrence of malicious source addresses, wherein each indicator value has a respective dynamic threshold associated therewith based on which the indicator value is set to indicate whether the respective attack characteristic is observed, and wherein the dynamic threshold varies over time based at least in part on historical values for the dynamic threshold; and
determining, based on the generated indicator values, whether a network attack is indicated by the network traffic.

18. A computer readable non-transitory storage medium storing instructions of a computer program which when executed by a computer system results in performance of a method for detecting and predicting network attacks, the method comprising:
  acquiring attack alerts and indicator values representative of network traffic;
  converting the alerts and indicator values into vectors;
  using the vectors to generate training data representative of the alerts and the indicator values;
  implementing a learning algorithm to process the training data to generate decision rules; and
  performing network attack detection or prediction based on the generated decision rules, the performing network attack detection or prediction comprising:
    processing network traffic to generate indicator values, each indicator value indicative of whether a respective attack characteristic is observed in the network traffic, wherein the indicator values are representative of indicators that include volume of traffic, rate of spoofing, rate of occurrence of unique source addresses, rate of occurrence of unique geographical locations of the source of traffic, ratio of SYN to non-SYN traffic and rate of occurrence of malicious source addresses, wherein each indicator value has a respective dynamic threshold associated therewith based on which the indicator value is set to indicate whether the respective attack characteristic is observed, and wherein the dynamic threshold varies over time based at least in part on historical values for the dynamic threshold; and
  determining, based on the generated indicator values, whether a network attack is indicated by the network traffic.

* * * * *